United States Patent
Nieuwenhuizen

(10) Patent No.: US 10,753,342 B2
(45) Date of Patent: Aug. 25, 2020

(54) LIGHTING PROTECTION SYSTEM

(71) Applicant: Siemens Gamesa Renewable Energy A/S, Brande (DK)

(72) Inventor: John Nieuwenhuizen, Horsens (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 242 days.

(21) Appl. No.: 15/614,739

(22) Filed: Jun. 6, 2017

(65) Prior Publication Data

US 2017/0356426 A1    Dec. 14, 2017

(30) Foreign Application Priority Data

Jun. 9, 2016  (EP) .................................. 16173684

(51) Int. Cl.
*H02G 13/00* (2006.01)
*F03D 80/30* (2016.01)

(52) U.S. Cl.
CPC ............ *F03D 80/30* (2016.05); *H02G 13/40* (2013.01); *H02G 13/80* (2013.01); *F05B 2230/80* (2013.01); *F05B 2240/14* (2013.01); *Y02E 10/72* (2013.01); *Y02P 70/523* (2015.11)

(58) Field of Classification Search
CPC ........ F03D 80/30; H02G 13/40; H02G 13/80; Y02P 70/523; F05B 2230/80; F05B 2240/14; Y02E 10/72
See application file for complete search history.

(56) References Cited

U.S. PATENT DOCUMENTS

| 8,888,454 B2 | 11/2014 | Hansen | |
| 2007/0009361 A1* | 1/2007 | Moller Larsen | H02G 13/00 416/146 R |
| 2012/0269631 A1* | 10/2012 | Lewke | F03D 80/30 416/146 R |
| 2013/0100570 A1* | 4/2013 | Lyngby | H02H 7/24 361/117 |

(Continued)

FOREIGN PATENT DOCUMENTS

| CN | 102365454 A | 2/2012 |
| CN | 102900630 A | 1/2013 |

(Continued)

OTHER PUBLICATIONS

Extended European Search Report for European Application No. EP 16173684.8, dated Dec. 16, 2016.

(Continued)

*Primary Examiner* — Pete T Lee
(74) *Attorney, Agent, or Firm* — Schmeiser, Olsen & Watts LLP

(57) ABSTRACT

A lightning protection system of a wind turbine is provided, including a blade lightning conductor arranged in a rotor blade of the wind turbine to extend into the hub, a stationary conductor to provide a blade grounding path to ground during a lighting strike, a brush arranged to electrically connect the blade lightning conductor and the stationary conductor, and a discharge means arranged to provide a separate discharge path from the blade lightning conductor to ground. Furthermore, a wind turbine, and a method of equipping a wind turbine with a lightning protection system, is also provided.

14 Claims, 3 Drawing Sheets

(56) References Cited

U.S. PATENT DOCUMENTS

2013/0336786 A1* 12/2013 Kissinger ................ F03D 80/30
  416/1
2016/0252078 A1* 9/2016 Sogaard .................. F03D 80/30
  290/55

FOREIGN PATENT DOCUMENTS

| CN | 202737293 U | 2/2013 |
| EP | 2336560 A1 | 6/2011 |
| EP | 2889476 A1 | 7/2015 |
| JP | 2015127512 A | 7/2015 |
| WO | WO 0186144 A1 | 11/2001 |
| WO | WO 2014207047 A1 | 12/2014 |

OTHER PUBLICATIONS

Non-English Chinese Office Action for application No. 201710432326.5 dated Oct. 15, 2018.

* cited by examiner

LIGHTING PROTECTION SYSTEM

CROSS-REFERENCE TO RELATED APPLICATIONS

This application claims priority to European application No. EP 16173684.8 having a filing date of Jun. 9, 2016, the entire contents of which are hereby incorporated by reference.

FIELD OF TECHNOLOGY

The following relates to a lighting protection system of a wind turbine, and a wind turbine comprising such a lightning protection system.

BACKGROUND

A tall structure such as a wind turbine is equipped with a lightning protection system (LPS) which serves to receive a stroke at one or more specific sites or receptors, and to divert the ensuing electrical current to ground during a lightning strike. The blades of a wind turbine are particularly vulnerable to lightning strikes on account of their length. The LPS of a wind turbine therefore generally includes a lightning conductor for each blade, arranged in the interior of the blade and extending along its length from base to tip. The blades are generally mounted to a hub or spinner, and the combined arrangement rotates relative to the stationary nacelle or canopy. The rotating assembly is connected to the stationary nacelle by means of a bearing. To electrically connect the rotating hub and blade arrangement to the relatively stationary nacelle, each LPS conductor of a blade terminates in a sliding brush that effects the electrical connection to the stationary conductive ring arranged in the hub. The conductive ring in turn is electrically connected to ground, so that, in the event of a lightning strike to a receptor of a blade, the electrical current sees a direct path along the blade lightning conductor and across the brush to ground.

A problem with this kind of lightning protection system arises on account of the nature of the electrical system defined by the moving and stationary lighting conductors, the interface between them, the outside environment, and the environment inside the hub. As the long blades move through the air, static electricity will build up on the LPS conductors and therefore also on the brushes, particularly when the air is very dry. The level of static electricity build-up on a long LPS down-conductor can be extreme in the presence of an elevated electrical field potential, for example during a storm. Furthermore, a powerful radio transmitter in the neighbourhood can induce high frequency currents in an LPS down-conductor, which effectively acts as an antenna. In an ideal LPS environment, static electricity build-up on a down-conductor or induced currents in a down-conductor would not be a problem, since the purpose of the sliding brushes is to provide a discharge path to ground. However, the environment inside the hub is not ideal, since contamination in the form of oil, grease and/or particles detracts from the function of the sliding brushes. Lubricant can escape or leak from the various drives, motors and hydraulic components in the hub, and can be deposited as a thin film over any surface in the hub interior. Even if such components are well sealed, it is basically unavoidable that some quantity of grease or oil will escape over the course of time. If a thin film of grease is deposited along the path travelled by the sliding brushes, the grease film effectively acts as an insulator between the blade conductor and electrical ground. As a result, a voltage will build up between the brush and the thin film of grease. Eventually, the voltage will reach the level of a break-down voltage for that thin film, at which point the insulator collapses and conducts, allowing the built-up static electricity to discharge to ground. After discharging, static will start to build up again, and the build-up/breakdown cycle will repeat indefinitely.

The breakdown discharge spark is associated with emission of wide-band electromagnetic radiation. The LPS of the wind turbine therefore unintentionally acts as a source of electromagnetic noise. The level of electromagnetic noise can reach levels that compromise adherence to electromagnetic compatibility (EMC) limits laid down by various standards.

SUMMARY

An aspect relates to providing a lightning protection system for a wind turbine that overcomes the problems described above.

According to embodiments of the invention, the wind turbine lightning protection system comprises a blade lightning conductor arranged in a rotor blade of the wind turbine to extend from the blade tip region into the hub; a stationary conductor to provide a blade grounding path to ground during a lighting strike; and a brush arranged to electrically connect the blade lightning conductor and the stationary conductor; which lightning protection system is characterized by a discharge means arranged to provide an electrically separate discharge path to ground for static charge build-up on the blade lightning conductor.

In the context of embodiments of the invention, the separate discharge path is an electrically distinct "alternative" to the blade grounding path. In other words, current is given an alternative path to ground when conditions are favourable to the build-up of static charge on the long blade lightning conductors. The discharge path advantageously prevents static charge from building up to a level that would otherwise result in a discharge spark across the thin grease film between brush and stationary conductor. However, in the event of a lightning strike, the breakdown voltage and discharge spark are no longer electrically relevant, and the current travels along the blade grounding path in the usual manner. In the context of embodiments of the invention, the expression "electrically separate discharge path to ground" for static charge is to be understood to mean that this path to ground is not the main path to ground that is used by electric current ensuing from a lightning strike According to embodiments of the invention, a wind turbine comprises such a lightning protection system. Because of the continuously available discharge path to ground for any static charge that might otherwise tend to accumulate on the blade lightning conductors, the likelihood of a discharge spark (occurring across a thin grease film between brush and stationary conductor) can be reduced or even eliminated. This means that the wind turbine can favourably comply with EMC regulations even when atmospheric conditions would favour the build-up of static charge.

According to embodiments of the invention, the method of equipping a wind turbine with a lightning protection system comprises the steps of arranging a blade lightning conductor in a rotor blade of the wind turbine to extend into the wind turbine hub; arranging a stationary conductor in the nacelle to provide a blade grounding path to ground during a lighting strike; arranging a brush to electrically connect the blade lightning conductor and the stationary conductor; and providing a discharge means to present a separate discharge path for static charge build-up from the blade lightning conductor to ground.

The inventive method is particularly suited to adapting an existing lightning protection system so that it no longer emits unwanted broadband electromagnetic noise on account of static discharge. An existing lightning protection can be augmented by providing a discharge means for one or more of the blade lightning conductors, and connecting such a discharge means between each blade lightning conductor and a suitable surface, as will be explained below.

Particularly advantageous embodiments and features of the invention are given by the dependent claims, as revealed in the following description. Features of different claim categories may be combined as appropriate to give further embodiments not described herein.

In the following, it may be assumed that the stationary conductor has an annular or ring-shaped surface along which the brushes of the blade lightning conductors can slide as the hub and blades rotate. Depending on the wind turbine construction, this annular or ring-shaped surface can for example be vertical, facing outward into the hub. Equally, the annular or ring-shaped surface can be the outer surface of a cylindrical body. In any case, this stationary conductor may be assumed to be electrically connected in the usual manner, as will be known to the skilled person, to LPS equipment that offers electrical current a safe and direct path to ground in the event of a lightning strike.

The blades of a wind turbine are mounted to the hub, and the combined arrangement rotates collectively depending on various factors such as wind speed. While the blades are generally most vulnerable to a lighting strike on account of their length, the hub may also receive a lighting strike. To this end, the hub is generally also electrically connected to ground in some way, as will be known to the skilled person. For example, in a preferred realisation, the wind turbine LPS comprises a hub lightning conductor arranged to provide a hub grounding path to ground. Therefore, in a particularly preferred embodiment of the invention, a discharge means is arranged between a blade lightning conductor and hub lightning conductor to electrically connect the blade lightning conductor with the hub, and therefore also to ground via the hub ground path.

As indicated above, the hub rotates relative to the stationary nacelle or bedframe of the wind turbine. Since the blades are mounted to the hub at its outermost boundary, the base of each blade describes a relatively large circle with each revolution of the hub about its (essentially horizontal) rotational axis. For this reason, the brush interface is required between the blade lightning conductors and the stationary component. However, a central point of the hub may lie essentially along the hub rotational axis. This allows the hub to be grounded by means of a conductor arranged to lie essentially along the hub rotational axis. In a preferred embodiment of the wind turbine LPS, a rotary joint is included in the hub grounding path, and the separate discharge path for the static charge of a blade also travels through the rotary joint. The rotary joint is preferably realized as a sealed rotary joint, so that it cannot be affected by any oil or grease contamination. The sealed realisation of the rotary joint ensures that its primary function as an electrical conductor will not be compromised by any thin film accumulation.

The breakdown voltage of a film of oil depends to some extent on the dielectric properties of the oil, the thickness of the layer, ambient temperature, etc. Preferably, the discharge means is realized in consideration of the parameters typically occurring in the hub of a particular wind turbine, for example by considering the type of oil used to lubricate components in the hub, observed levels of oil contamination in similar wind turbines, typical weather conditions at the installation site, etc. In a preferred embodiment of the invention, the discharge means is realized to pass an electrical current in the range of about 10 mA on the basis of a breakdown voltage of about 5 V or less.

In a particularly preferred embodiment of the invention, the discharge means comprises a discharge resistor with a suitable value. One terminal of the discharge resistor can be connected to a down conductor, and the other terminal of the discharge resistor is electrically connected to ground via the separate discharge path. For example, a resistor can be electrically connected between the blade lighting conductor and the hub lightning conductor. The discharge resistor is preferably arranged close to the down-conductor in order to minimize the circuit length (loop area), thereby keeping to a minimum any voltage induced due to magnetic coupling. Preferably, the discharge resistor is enclosed in a moulded casing for mechanical and electrical protection.

A sliding brush can be held by a sliding brush bracket used to clamp the lower end of a down conductor to a sliding brush. A holding means can hold the sliding brush bracket (with the sliding brush and its electrical connection to the down conductor) securely in place. This robust mounting arrangement ensures that lightning current from a down conductor will safely pass through the sliding brush to ground. A bracket can be made from a non-conductive material such as Bakelite, fibreglass, etc. This construction is used to good effect by embodiments of the invention, following the insight that static charge will also envelope or surround non-conductive materials. For example, one terminal of the discharge resistor can be connected to such a bracket, while the other terminal of the discharge resistor is electrically connected to ground via the discharge path. Any build-up of static charge can therefore trickle through the resistor to ground. The hub is generally made of metal, or is at least reinforced by a metal construction. In a preferred embodiment of the invention, the ground terminal of the discharge resistor is electrically connected to a metal structure of the hub. By electrically connecting the "ground" terminal of a discharge resistor to the bracket, a path to ground through the metal hub structure and the hub grounding path is ensured.

In a preferred embodiment of the invention, each blade of a wind turbine is equipped with a blade lightning conductor, and the wind turbine LPS comprises a discharge means arranged to provide a separate discharge path from each blade lightning conductor to ground, for example through the hub lightning conductor as described above, with its path to ground through the rotary joint.

BRIEF DESCRIPTION

Some of the embodiments will be described in detail, with reference to the following figures, wherein like designations denote like members, wherein.

DETAILED DESCRIPTION

Figure 1:
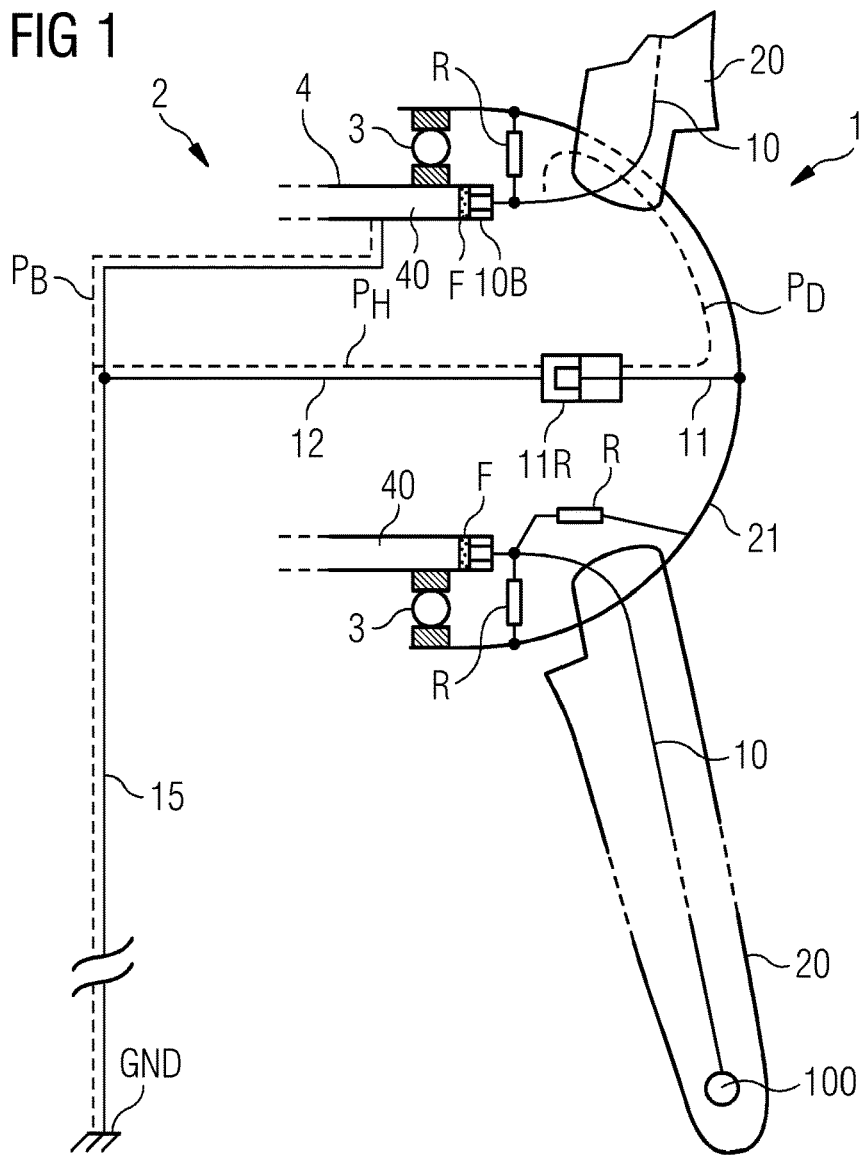
FIG. 1 shows a lightning protection system, in accordance with embodiments of the present invention.

FIG. 1 shows a lightning protection system 1 according to embodiments of the invention. The diagram is a very simplified schematic representation showing only the relevant aspects of the inventive LPS 1 installed in a wind turbine. A wind turbine hub 21 is indicated. The hub 21 is mounted to a nacelle 4 of the wind turbine by means of a bearing 3. The hub 21, which can also be hit by a lightning strike, is provided with a hub lightning conductor 11. Since the hub 21 rotates relative to the nacelle, a sealed rotary joint 11R connects the rotating hub lightning conductor 11 to a stationary conductor 12, which in turn leads to ground GND. Several blades 20 are mounted to the hub 21. A lightning conductor 10 extends along the length of each blade 20, terminating at the outer blade end in a receptor 100 which ensures that a lightning strike is received in a controlled manner. The other ends of each lightning conductor 10 terminate at a brush 10B, which is in contact with a stationary conductive ring 14 in the hub 21. In the event of a lightning strike to a blade 20, the current is provided with a blade grounding path $P_B$ through the lightning conductor 10 and the brush 10B to a down conductor 15 in the wind turbine tower to reach ground GND. As explained above, a thin film F of oil or grease can be deposited over time on the surface of the annular component 14. This undesirable thin film acts as a dielectric layer, effectively insulating the brush 10B from the annular component 14. The contact surface of the brush 10B and the opposing surface of the ring 14 act as the plates of a capacitor, with the thin oil film F in between as a dielectric layer.

To avoid the problems associated with the build-up of static charge on the lightning conductors 10, a discharge resistor R is arranged in parallel with the hub lightning conductor 11. In this way, even during conditions that are favourable to static charge build-up, there will not be significant charge build-up on the blade lightning conductors 10, since charge can always pass through the discharge path $P_D$ offered by the discharge resistors R to the hub 21, and from there via the hub lightning conductor 11 along the continually available hub grounding path $P_H$ to ground GND. The continuous availability of the hub grounding path $P_H$ to ground GND is ensured by the sealed rotary joint 11R, which is not susceptible to grease contamination.

Figure 2:
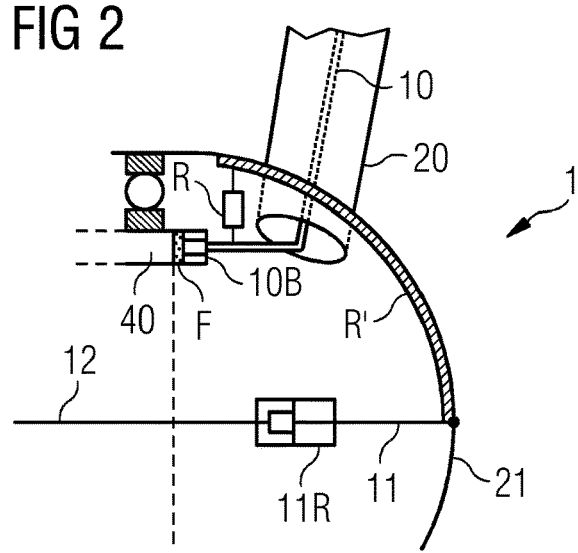
FIG. 2 shows a lightning protection system, in accordance with embodiments of the present invention.

In FIG. 1, the hub 21 itself or even just its interior surface can be electrically conductive, so that the discharge means R need only physically contact the interior surface of the hub 21 in order for a satisfactory electrical connection to the hub grounding path $P_H$. Since the blades and hub rotate as a single entity, such a connection is straightforward to achieve. FIG. 2 shows an alternative realisation, which may be preferred if the hub is manufactured of a non-conducting material such as fibreglass. Here, an electrical connector R' comprises a simple low-inductance (preferably also low-ohmic) metal strip, which can lie along the hub inner surface if desired, electrically connecting a blade lightning conductor 10 to the hub lightning conductor 11. The metal strip R' is preferably dimensioned to offer an electrical path to ground when conditions are favourable to the build-up of static charge on the blade lightning conductors 10.

Figure 3:
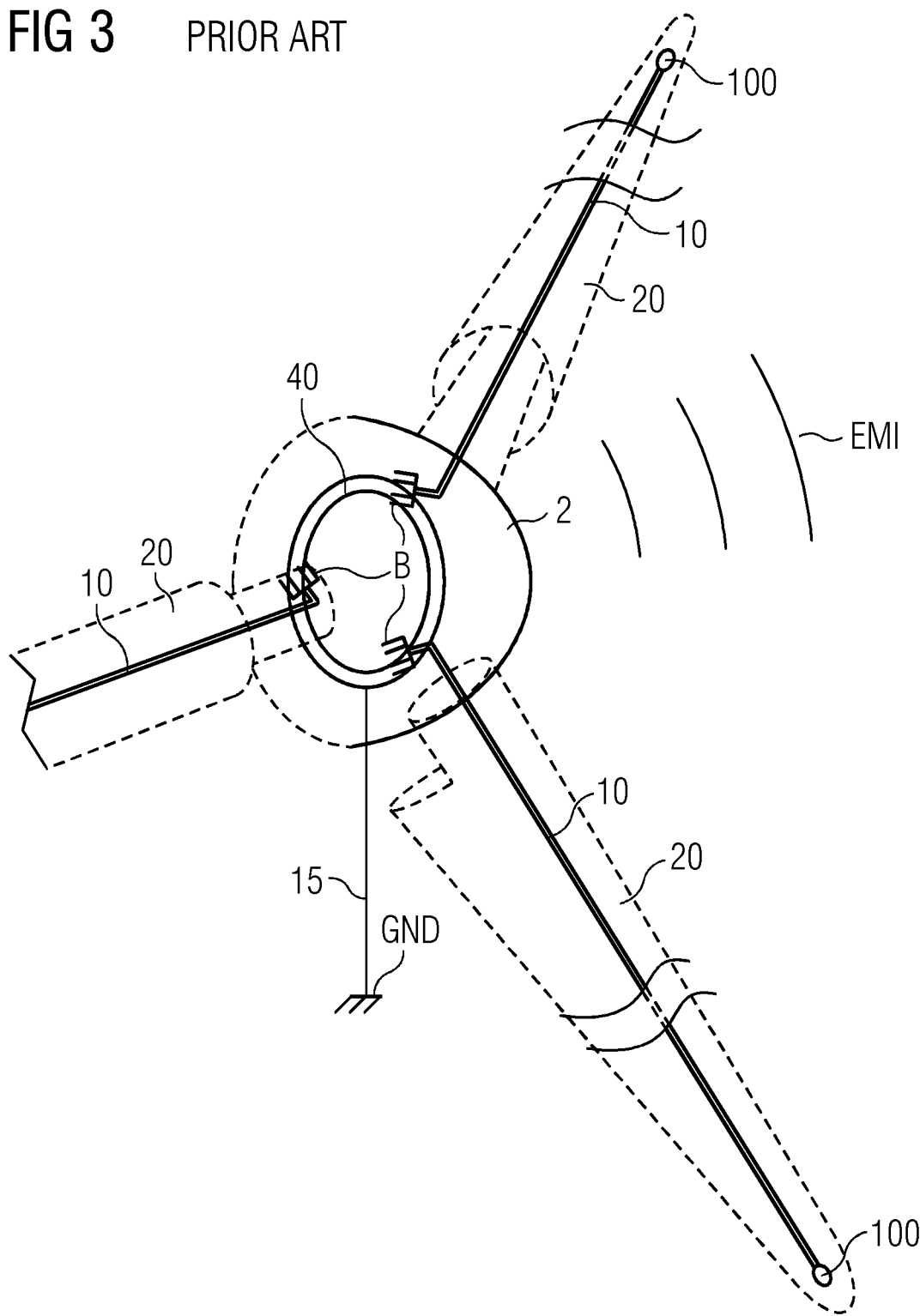
FIG. 3 shows a prior art lightning protection system.

In prior art wind turbine lightning protection systems, static electricity will inevitably build up on the blade lightning conductors 10, particularly under favourable conditions such as during very dry weather, during the build-up to a storm, or during any conditions in which the blade moves through ions or charged particles such as ice crystals, sand, etc. FIG. 3 shows a simplified view of the hub 21 and blades 20 of a prior art wind turbine. Each blade 20 is equipped with a lightning conductor 10 and a receptor 100 in the blade tip region. A blade lightning conductor 10 makes electrical contact to an annular ring 14 by means of a brush 10B. The annular ring 14 is in turn connected to electrical ground GND by the usual suitable arrangement of conductors through the nacelle and tower.

Figure 4:
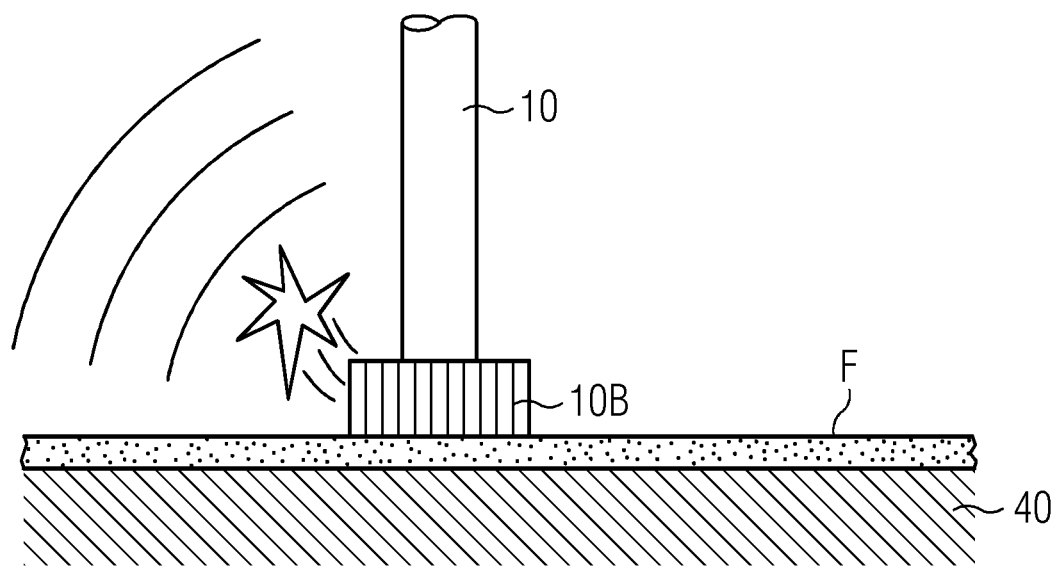
FIG. 4 shows a static discharge event across a thin oil film as observed in a prior art wind turbine lightning protection system.
Figure 5:
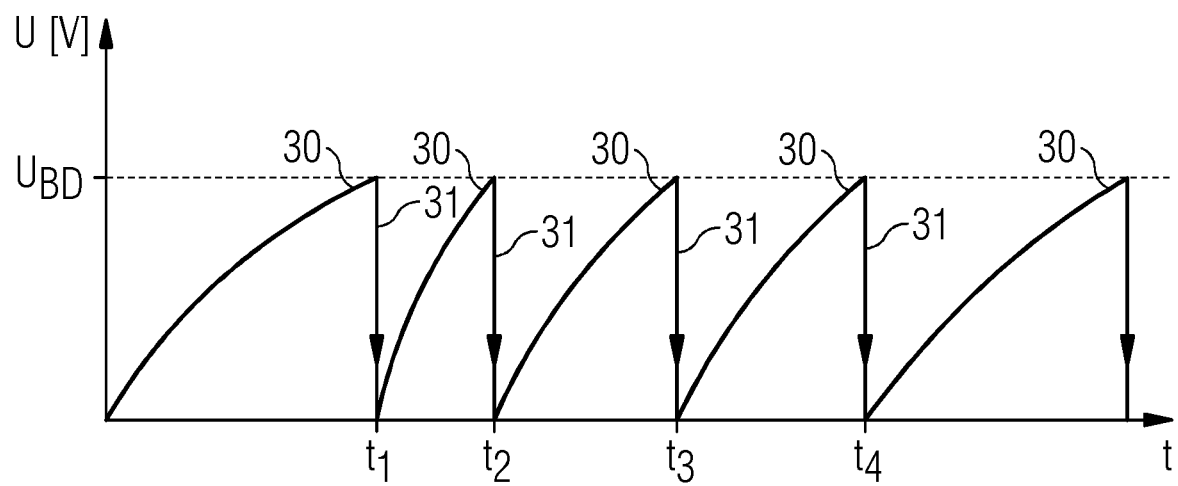
FIG. 5 shows repeated static build-up and breakdown as observed in a prior art wind turbine lightning protection system.

However, the presence of equipment such as motors and drives in the hub and the inevitable contamination by grease and oil ultimately leads to a thin film of grease on the surface of the annular component 14, and this thin film significantly reduces the effectiveness of the electrical connection between brush 10B and ring 14. FIG. 4 illustrates the effect of static build-up. The diagram shows a brush 10B of a lightning conductor 10 in the prior art LPS of FIG. 3 in contact with a thin grease film F that has been deposited on the annular component 14. As described above, the thin film F between the brush 10B and the ring 14 gives rise to a capacitor 10B, F, 14. Static charge will build up on the inside "plate" 10B of the capacitor. When the level of static charge on the brush 10B reaches the breakdown voltage for that thin film, the film suddenly becomes conductive, resulting in a discharge spark S and the emission of wide-band electromagnetic radiation which can be perceived as electromagnetic interference by electronic devices in nearby buildings, radio observatories, airplanes, etc. Once the static charge has been passed to ground, the thin film once again acts as an insulating film, and static charge starts to build up again. This cyclic behaviour is illustrated in FIG. 5, which shows a graph of static charge U or potential U [V] against time. The static charge on a lightning conductor 10 in a rotor blade builds up to the breakdown voltage level $U_{BD}$ of the thin film. The value of the breakdown voltage $U_{BD}$ will depend on the type of oil or grease, the thickness of the film, and various other parameters, and may fluctuate as these parameters change. The rate at which the static charge builds up can be fast or slow, depending on how favourable the environmental conditions are. Once the static charge on a lightning conductor 10 has reached the breakdown voltage $U_{BD}$, the instantaneous discharge 31 results in a discharge spark S, and the charge on the lightning conductor 10 effectively drops to zero, only to start increasing again towards the breakdown voltage $U_{BD}$. As long as the thin film is present between the brushes 10B and the annular conductor 14, the charge/discharge cycle can continue indefinitely, resulting in problematic wide-band electromagnetic radiation, a detrimental effect on reception by a radio receiver in the vicinity, and possible failure to comply with locally applicable EMC regulations.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A lightning protection system of a wind turbine, comprising:
   a blade lightning conductor arranged in a rotor blade of the wind turbine to extend into a hub;

a stationary conductor to provide a blade grounding path to ground during a lightning strike;

a brush arranged to electrically connect the blade lightning conductor and the stationary conductor; and a discharge means arranged exterior to the rotor blade and within the hub, the discharge means being electrically connected between the brush and the blade lightning conductor to provide a separate discharge path for static charge build-up from the blade lightning conductor to ground.

2. The lightning protection system according to claim 1, wherein the discharge means is electrically connected between the blade lightning conductor and the hub.

3. The lightning protection system according to claim 1, further comprising a hub lightning conductor arranged to provide a hub grounding path to ground during a lightning strike, and wherein the discharge means is electrically connected to the hub lightning conductor.

4. The lightning protection system according to claim 1, further comprising a rotary joint in the hub grounding path, and wherein the separate discharge path is through the rotary joint.

5. The lightning protection system according to claim 4, wherein the rotary joint is a sealed rotary joint.

6. The lightning protection system according to claim 1, wherein the discharge means is configured to pass an electrical current in a range of 10 mA.

7. The lightning protection system according to claim 1, wherein the discharge means comprises a discharge resistor.

8. A wind turbine comprising a lightning protection system according to claim 1.

9. The wind turbine according to claim 7, further comprising a plurality of rotor blades, a blade lightning conductor arranged in each rotor blade, and a discharge means arranged to provide a separate discharge path from each blade lightning conductor to ground.

10. The lightning protection system according to claim 1, wherein the discharge means physically contacts an interior surface of the hub.

11. A method of equipping a wind turbine with a lightning protection system, comprising:

arranging a blade lightning conductor in a rotor blade of the wind turbine to extend into the wind turbine hub;

arranging a stationary conductor in a nacelle to provide a blade grounding path to ground during a lightning strike; and arranging a brush to electrically connect the blade lightning conductor and the stationary conductor; and providing a discharge means to present a separate discharge path from the blade lightning conductor to ground, the discharge means being arranged exterior to the rotor blade and within the hub, the discharge means being electrically connected between the brush and the blade lightning conductor.

12. The method according to claim 11, wherein the step of providing a discharge means for a blade lightning conductor comprises a step of arranging an electrical connection between the blade lightning conductor and a hub lightning conductor.

13. The method according to claim 11, wherein the step of providing a discharge means for a blade lightning conductor is performed in a retro-fit procedure.

14. The method according to claim 11, wherein the discharge means physically contacts an interior surface of the hub.

* * * * *